United States Patent
Saur

(10) Patent No.: US 12,551,281 B2
(45) Date of Patent: Feb. 17, 2026

(54) INDIVIDUALIZING GENERIC REFERENCE MODELS FOR OPERATIONS ON THE BASIS OF INTRAOPERATIVE STATE DATA

(71) Applicant: Carl Zeiss Meditec AG, Jena (DE)

(72) Inventor: Stefan Saur, Aalen (DE)

(73) Assignee: Carl Zeiss Meditec AG, Jena (DE)

( * ) Notice: Subject to any disclaimer, the term of this patent is extended or adjusted under 35 U.S.C. 154(b) by 31 days.

(21) Appl. No.: 17/451,383

(22) Filed: Oct. 19, 2021

(65) Prior Publication Data
US 2022/0125516 A1  Apr. 28, 2022

(30) Foreign Application Priority Data
Oct. 27, 2020 (DE) .................. 102020128199.4

(51) Int. Cl.
| | |
|---|---|
| *A61B 34/10* | (2016.01) |
| *A61B 34/00* | (2016.01) |
| *A61B 34/20* | (2016.01) |
| *A61B 90/20* | (2016.01) |
| *G06N 3/02* | (2006.01) |
| *G06N 5/01* | (2023.01) |

(52) U.S. Cl.
CPC .............. *A61B 34/10* (2016.02); *A61B 34/20* (2016.02); *A61B 34/25* (2016.02); *A61B 90/20* (2016.02); *G06N 3/02* (2013.01); *G06N 5/01* (2023.01); *A61B 2034/105* (2016.02); *A61B 2034/2065* (2016.02); *A61B 2034/2068* (2016.02); *A61B 2034/258* (2016.02)

(58) Field of Classification Search
CPC ...... A61B 2034/105; A61B 2034/2065; A61B 2034/2068; A61B 2034/258; A61B 34/10; A61B 34/20; A61B 34/25; A61B 90/20; A61B 2034/256; A61B 2090/371; A61B 2090/376; G01L 1/146; G06F 3/041; G06N 3/02; G06N 3/044; G06N 3/045; G06N 3/08; G06N 5/01; G16H 20/40; G16H 30/40; G16H 50/20; G16H 50/50
See application file for complete search history.

(56) References Cited

U.S. PATENT DOCUMENTS

| | | | |
|---|---|---|---|
| 11,259,874 B1 * | 3/2022 | Landon | ................ G16H 40/67 |
| 2013/0281845 A1 * | 10/2013 | Luiken | ................ A61B 5/0071 |
| | | | 600/431 |
| 2015/0057498 A1 * | 2/2015 | Akimoto | ............. A61B 1/0005 |
| | | | 600/103 |
| 2017/0209071 A1 * | 7/2017 | Zhao | ....................... G06T 7/149 |
| 2018/0014891 A1 * | 1/2018 | Krebs | ................ A61B 8/0875 |

(Continued)

FOREIGN PATENT DOCUMENTS

DE  10357205 A1  7/2005

*Primary Examiner* — Jason M Ip
(74) *Attorney, Agent, or Firm* — Honigman LLP; Brett A. Krueger

(57) ABSTRACT

A generic reference model for a planned operation defines a multiplicity of landmarks that describe the planned operation. State data that describe a specific operation are received, for example by a surgical microscope, while performing a specific operation on the basis of the planned operation. Then the generic reference model is individualized in relation to the specific operation on the basis of the state data by virtue of adapting one or more landmarks of the multiplicity of landmarks to the specific operation.

8 Claims, 5 Drawing Sheets

(56) References Cited

U.S. PATENT DOCUMENTS

| | | |
|---|---|---|
| 2018/0055582 A1* | 3/2018 | Krimsky ............... G16H 50/50 |
| 2019/0066314 A1 | 2/2019 | Abhari et al. |
| 2019/0090954 A1 | 3/2019 | Kotian et al. |
| 2020/0069372 A1 | 3/2020 | Dufour et al. |
| 2020/0121402 A1 | 4/2020 | Pedreira de Cerqueira Filho |
| 2020/0188026 A1* | 6/2020 | de Souza ............... A61B 34/76 |

* cited by examiner

INDIVIDUALIZING GENERIC REFERENCE MODELS FOR OPERATIONS ON THE BASIS OF INTRAOPERATIVE STATE DATA

CROSS REFERENCE TO RELATED APPLICATIONS

This U.S. patent application claims priority under 35 U.S.C. § 119 from German Patent Application DE 10 2020 128 199.4, filed on Oct. 27, 2020, which is hereby incorporated by reference in its entirety.

TECHNICAL FIELD

Various examples of the disclosure relate to techniques for performing an operation in correspondence with a corresponding generic reference model. Various examples of the disclosure relate in particular to techniques for individualizing the generic reference model on the basis of state data that describe the operation.

BACKGROUND

The prior art has disclosed surgical microscopes that offer very different items of information to a user, generally the surgeon, in the eyepiece. By way of example, a surgical microscope that comprises a camera which generates an electronic image signal. The image signal is displayed on an electronic eyepiece which comprises a corresponding display apparatus for the electronic image data. Further items of information may also be output there.

An image-guided surgical navigation system can be used by medical specialists to assist the medical specialists during a medical intervention. The image-guided surgical navigation system can use information from a presurgical image, for instance a 3-D MRI image, to guide the medical staff during the medical intervention. By way of example, the 3-D MRI image can present a plurality of reference markings, which are attached to a relevant region, or one or more landmark features.

Such a technique is disadvantageous in that presurgical images are required to implement an interaction with the surgeon during the operation. Capturing presurgical images may be complicated.

BRIEF SUMMARY

Accordingly, various examples are based on the advantages of designing an intraoperative interaction with a surgeon to be particularly robust and flexible and reliable.

Using the techniques described herein, it is possible while using sensors (e.g., image sensors) of a surgical microscope or other sensors in an operating theatre to continuously adapt landmarks of a reference model to the current conditions during a microsurgical intervention or any other operation. Hence, the reference model can be individualized on the basis of the adapted landmarks for the purposes of analysing the behaviour during the operation. As a result, the user interaction is more independent of preoperative data and can better adapt to the current conditions. Further, there can be a temporal individualization for characteristic actions when using a surgical microscope or other items of medical equipment.

To this end, an algorithm in a data processing unit, which algorithm has access to sensors of the surgical microscope, for example, or other items of medical equipment and analyses these (virtually) in real-time, can be used to adapt landmarks of the reference model in space and/or time. In this case, the adaptation can be implemented in a manner depending on or independently of the history of previous data and decisions. By way of example, there could be a hierarchy between the landmarks and the landmarks could be adapted with the hierarchy being taken into account.

A method comprises obtaining a generic reference model for a planned operation. The generic reference model defines a multiplicity of landmarks. The landmarks of the multiplicity of landmarks describe the planned operation. The method also comprises receiving state data. The state data describe a specific operation. The state data are received while the specific operation is being performed. Here, the specific operation is performed on the basis of the planned operation. Moreover, the method comprises individualizing the generic reference model in relation to the specific operation on the basis of the state data. This is implemented by virtue of one or more landmarks of the multiplicity of landmarks being adapted to the specific operation.

Thus, in general, the generic reference model can describe one or more courses of events (event sequences) of the planned operation. In this case, a variability may be provided, the specific operation being able to vary therewithin.

The specific operation can be a specific instance of the planned operation in accordance with a certain course of events. Hence, in principle, the specific operation can orient itself using the planned operation but can have one or more individual deviations therefrom.

Individualizing the generic reference model may mean that one or more landmarks of the multiplicity of landmarks are specified or altered. This means that the one or more landmarks are adapted to the specific operation. As a result, it is possible to take account of differences or individual peculiarities of the specific operation in comparison with the generic planned operation.

Such techniques may render an individualization of the generic reference model in the lead up to the planned operation, for example on the basis of preoperative image data, superfluous. Instead, it is possible to react dynamically to specific incidents/situations while the specific operation is being performed. This reduces the preoperative complexity. Moreover, the flexibility during the individualization is increased. In turn, this can increase the accuracy.

By way of example, the one or more landmarks may be adapted in this case in patient-specific fashion. This means that one or more landmarks can be adapted in the context of specific properties of the patient. By way of example, a position and/or orientation (positioning) of anatomical features could be stored accordingly in the landmarks. Typical properties of anatomical features could be specified, for example how anatomical features are formed in the case of the specific patient.

As an alternative or in addition thereto, the one or more landmarks can be adapted in surgeon-specific fashion. By way of example, a specific variant of a course of events of the specific operation, which is chosen by the respective surgeon, can be stored in one or more landmarks. It would be conceivable for a certain medical device used by the surgeon—surgical instruments, for example—to be selected.

As an alternative or in addition thereto, the one or more landmarks could also be adapted to the utilized items of medical equipment. By way of example, different items of medical equipment may be present in different operating theatres. The one or more landmarks could be adapted accordingly.

A plurality of landmarks of the multiplicity of landmarks can depend on one another, at least in part, in hierarchic fashion. This means that there can be hierarchically superordinate and hierarchically subordinate landmarks. If a hierarchically superordinate landmark is adapted, this may have effects on one or more hierarchically subordinate landmarks.

Very different aspects of the specific operation can be individualized by such an adaptation of the landmarks. This facilitates an accurate adaptation of the specific operation to the surround present.

By way of example, adapting a first landmark may depend on how a second landmark, which is arranged so as to be hierarchically superordinate to the first landmark, is adapted. By way of example, this could be relevant, in particular, if different landmarks are relevant to a certain course of the specific operation, which may be selected from a plurality of possible courses. If the specific course of the operation is then selected, it is possible to accordingly adapt the corresponding landmarks that describe this course.

As a result, it may be possible to take account of more complex relationships and dependencies of the operation within the scope of the reference model and nevertheless achieve an efficient individual adaptation to the specific operation.

The multiplicity of landmarks of the generic reference model may comprise one or more anatomical features and optionally a respectively associated variability. This means that the anatomical features may optionally be stored together with a variation bandwidth.

Then, it would be possible for the state data to comprise image data which are captured during the operation and which describe a target region of the specific operation in a patient undergoing the specific operation. Individualizing the generic reference model may comprise patient-specific adapting of the one or more anatomical features—e.g., within the variability—on the basis of the image data of the patient.

By way of example, the variability may describe an admissible variability or a typical variability. The variability can describe typical individual adaptations of anatomical features, as are known on the basis of knowledge in the literature.

By way of example, the image data could be received by a surgical microscope. X-ray images captured intraoperatively, for example, could also be used.

This may therefore render it possible to take account of specific individual anatomical features of the patient—optionally even without preoperative image data—within the scope of the generic reference model.

It would be possible for the multiplicity of landmarks of the generic reference model to comprise one or more instances of branching between different courses of the operation for the planned operation. This means that different courses can be chosen at certain points within the planned operation, said courses for example being able to differ in respect of the utilized items of medical equipment or the type of surgical intervention. Certain landmarks can then denote a branching/a decision point between these different courses of the operation.

It is possible that individualizing the generic reference model comprises the surgeon-specific selection of a course of the operation from the different courses of the operation.

By way of example, it would be possible to monitor the occurrence of certain triggers which are indicative for the one or the other course of the operation. If such a trigger is identified, it is possible within the scope of adapting the corresponding landmark to store that the one or the other course of the operation was taken.

Such techniques are advantageous in that even complex operations with different courses are able to be taken into account. In particular, this can provide the option of allowing the surgeon to only choose the one or the other course of the operation once the operation is being performed. As a result, the surgeon is provided with great flexibility and it is not necessary to parametrize corresponding properties preoperatively. As a result, specific events or incidents can be reacted to well during the operation.

It is possible for the multiplicity of landmarks of the generic reference model to comprise a timing of operation actions for one or more courses of the operation for the planned operation. Thus, time references that indicate when certain operation actions are typically carried out can be specified. Target values may be stored.

Individualizing the generic reference model may then comprise the surgeon-specific adaptation of the timing. By way of example, corresponding time values may be stored in the corresponding landmarks.

Such techniques allow monitoring of an individual speed of the surgeon during the specific operation. Target deviations can be determined. Problem points can be identified.

By way of example, it would be possible for at least some of the state data to be selected from the following group: image and/or sensor data of a surgical microscope; surround monitoring data of a surgical microscope; image data of an operating theatre; audio data from an operating theatre; user input received by a human-machine interface for the surgeon; settings of one or more items of medical equipment for the specific operation; and/or relative positioning between items of medical equipment and the site of the patient.

By way of example, the surgical microscope could comprise an eyepiece. As an alternative or in addition thereto, the surgical microscope could comprise an objective with a camera. Image data could accordingly be captured digitally. By way of example, the surgical microscope could comprise one or more sensors such as for example depth sensors, thermal image sensors, x-ray detectors, etc.

The image data could be captured by one or more cameras that are distributed in the operating theatre.

Audio data can be captured using one or more microphones arranged in the operating theatre, for example on the surgical microscope.

Surround monitoring by the surgical microscope can denote data in general which are captured by one or more sensors that are sensitive to goings-on away from the patient.

Such state data allows a particularly accurate illustrated state of the specific operation to be formed. As a result, the individualization can be implemented particularly accurately.

The generic reference model can be implemented in different ways. By way of example, the generic reference model could be implemented as a decision tree or as an artificial neural network. The decision tree could have a multiplicity of landmarks as nodes. The artificial neural network could be formed, for example, as a convolutional network with one or more convolutional layers. The artificial neural network can comprise activation layers (nonlinear activation functions), pooling layers, etc.

Such types of reference models have great flexibility in the context of adapting the landmarks. Complex procedures can also be stored. As a result, there can be an accurate individualization.

On the basis of the individualized reference model, the method could furthermore comprise triggering an interaction with a surgeon of the specific operation. By way of example, the interaction could be selected from a group comprising: user guidance for the surgeon; anomaly detection for deviations from an envisaged course of the specific operation; and/or quality assessment.

A computer program or a computer program product or a computer-readable storage medium comprises program code. The program code can be loaded and executed by a processor. This causes the processor to carry out a method. The method comprises obtaining a generic reference model for a planned operation. The generic reference model defines a multiplicity of landmarks. The landmarks of the multiplicity of landmarks describe the planned operation. The method also comprises receiving state data. The state data describe a specific operation. The state data are received while the specific operation is being performed. Here, the specific operation is performed on the basis of the planned operation. Moreover, the method comprises individualizing the generic reference model in relation to the specific operation on the basis of the state data. This is implemented by virtue of one or more landmarks of the multiplicity of landmarks being adapted to the specific operation.

A device comprises a processor unit. The processor unit is set up to carry out the following steps on the basis of program code: obtaining a generic reference model for a planned operation. The generic reference model defines a multiplicity of landmarks which describe the planned operation. Moreover, the processor unit is set up to receive state data describing the specific operation while performing a specific operation on the basis of the planned operation; and to individualize the generic reference model in relation to the specific operation on the basis of the state data and by virtue of adapting one or more landmarks of the multiplicity of landmarks to the specific operation.

The features set out above and features that are described below may be used not only in the corresponding combinations explicitly set out, but also in further combinations or in isolation, without departing from the scope of protection of the present invention.

DETAILED DESCRIPTION

Figure 1:
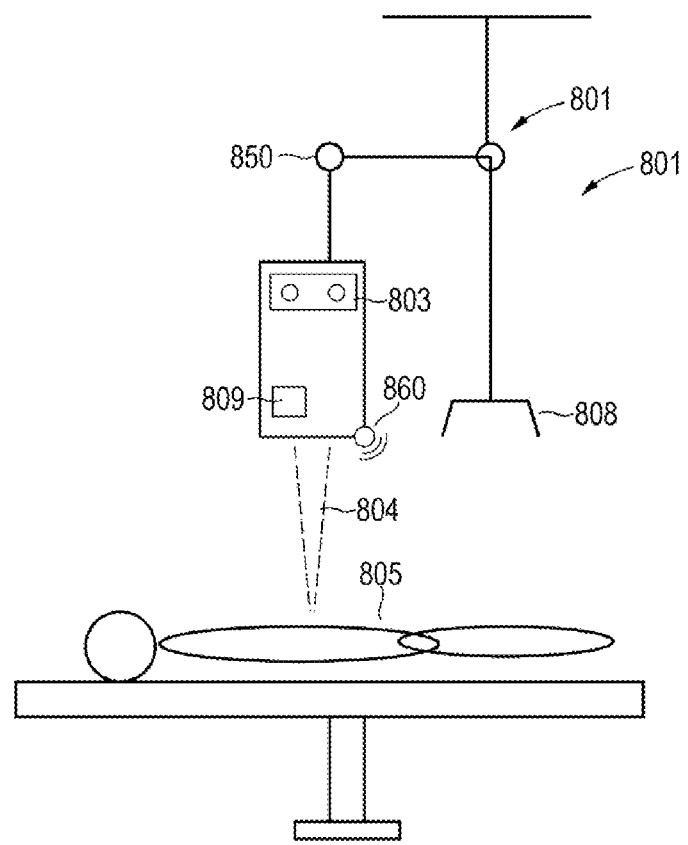
FIG. 1 schematically illustrates a surgical microscope as per various examples.

The properties, features and advantages of this disclosure described above and the way in which they are achieved will become clearer and more clearly understood in association with the following description of the exemplary embodiments which are explained in greater detail in association with the drawings.

The present disclosure is explained in greater detail below on the basis of preferred embodiments with reference to the drawings. In the figures, identical reference signs denote identical or similar elements. The figures are schematic representations of various embodiments of the disclosure. Elements illustrated in the figures are not necessarily illustrated as true to scale. Rather, the various elements illustrated in the figures are rendered in such a way that their function and general purpose become comprehensible to the person skilled in the art. Connections and couplings between functional units and elements as illustrated in the figures can also be implemented as an indirect connection or coupling. A connection or coupling can be implemented in a wired or wireless manner. Functional units can be implemented as hardware, software or a combination of hardware and software.

Various examples relate in general to techniques for assisting and/or monitoring a surgeon performing an operation. Below, this is referred to as "interaction with the surgeon". Examples of interactions with the surgeon include, for example, the output of user guidance for the surgeon. By way of example, voice instructions may be output. Graphical user guidance could also be output, for example as an overlay in VR glasses. Information could be superimposed on a screen of a surgical microscope, for example as an overlay on imaged anatomical features; however, an external screen could also be used. Control data for (semi-)automatically controlling one or more items of medical equipment could also be output. By way of example, it would be possible to carry out anomaly detection for deviations from an envisaged course of events of the operation. In this way, newly occurring deviations or deviations observed for the first time, for example, can be recognized. By way of example, a further example relates to a quality assessment. By way of example, it would be possible to monitor whether certain target specifications are obtained, for example the length of the operation not exceeding a given time period or an amount of removed healthy tissue being less than a given value. A guidance system for an inexperienced surgeon could be provided. It would be possible to implement a statistical analysis of the course of the surgery for quality management reporting. There could be automatic reporting; thus, for example, a reporting template for a physician's letter could be filled out automatically.

According to the various examples, an interaction with the surgeon can be triggered, i.e., for example, appropriate control data can be transmitted to a human-machine interface.

As a general rule, the techniques described herein can be performed in the context of different operations. By way of example, the techniques described herein can be performed in the context of microsurgical operations, for example in the skull region. By way of example, operations for removing tumours or stabilizing blood clots may profit from the techniques described herein. Surgical interventions in the spinal column, eye, dental region, ENT region or in the context of plastic reconstructive surgery would be a further example.

State data that describe the operation can be received in the various examples described herein. The state data can be determined intraoperatively. This means that the state data describe the specific operation. By way of example, the state data can comprise sensor data. The state data could also be obtained by way of a user input by a user, for example the surgeon. Some examples of state data which can be used in the various examples described herein are described below.

TABLE 1

Various examples of intraoperatively determined state data which describe a specific operation on a patient. Such state data can be combined with one another in the various examples. The availability of the various items of state data during an operation may vary.

| | Brief description | Exemplary details |
|---|---|---|
| I | State data of a surgical microscope | By way of example, the surgical microscope can comprise a camera and/or other sensors. By way of example, examples of other sensors would include distance sensors, for example TOF cameras or lidar sensors or stereo cameras. These can provide images with depth information. By way of example, the surgical microscope could also contain a microphone in order to receive audio signals from its surround. The corresponding sensors may be attached to a region of the surgical microscope facing the patient in order to provide information relating to said patient. However, it would also be possible to obtain surround monitoring data for the surgical microscope which primarily relate to goings-on in the operating theatre. Control data of the surgical microscope could also be received; by way of example these could describe a current setting of the optical unit and/or current positioning—i.e., for example, distance and/or orientation—of the surgical microscope. |
| II | Image data from the operating theatre | It would be possible for cameras which provide image data from the operating theatre to be attached to one or more points in the operating theatre. By way of example, these image data may contain information relating to a number of surgeons and/or medical staff in the operating theatre. By way of example, such image data could be used to monitor which items of surgery equipment are currently used and/or which persons are currently facing the patient. |
| III | Audio data from the operating theatre | One or more microphones can be used to make an audio recording of conversations in the operating theatre. It would be possible to automatically transcribe appropriate audio data in order to determine a textual content. |
| IV | User input | A user input by medical staff, for example the surgeon, can be received by way of a human-machine interface. By way of example, such a user input can be performed on a graphical interface—for instance of the surgical microscope—which facilitates inputs in the context of the state of the operation. Further options for the user input would be, for example, manual operations on the surgical microscope; a foot switch on the surgical microscope; etc. |
| V | Device settings | Different devices are typically used during operations, for instance in order to perform the intervention itself and/or to facilitate a monitoring of the state of the patient. It is possible for such devices to provide control data which are indicative for one or more settings of the operation of these devices. By way of example, one example would be the indication of the flow of a liquid with anaesthetic, etc. |
| VI | Relative positioning of devices with respect to patients | Relative positioning—i.e., for example, distance and/or orientation—of one or more items of medical equipment in relation to the patient could be obtained within the scope of the state data. Positioning in relation to the patient can be determined in a patient coordinate system. By way of example, the patient coordinate system can contain a defined position of different anatomical landmarks of the patient (situs). Thus, this allows determination of the relative positioning of items of equipment in relation to, for example, a target region of the operative intervention of the operation. In this case, there are different options for determining such relative positioning. In particular, navigation systems can be used which, for example, determine positioning of the items of medical equipment in the operating theatre, with the patient coordinate system being registered in the operating theatre at the same time. However, it would also be possible to determine the positioning in relation to the patient coordinate system directly, for example by virtue of determining a pose of the camera, which is fastened to the appropriate item of medical equipment, in relation to one or more anatomical landmarks of the patient on the basis of corresponding image data of the camera. In this example, the state data can also be referred to as tracking data which for example describe the position (xyz) and orientation (rotations in xyz) between focal point (tool centre point) of the surgical microscope and an anatomical feature of the patient. In this way, it is possible to set for example the orientations of the surgical microscope in relation to the patient. |

Various examples of the disclosure relate to the use of generic reference models for a planned operation. Expressed differently, the generic reference model can describe the planned operation, i.e., for example the course of events thereof, interventions to be carried out, etc. Such a description can be abstract from a specific instance of the planned operation (specific operation). By way of example, this means that the specific anatomy of the individual patient can remain unspecified in the generic reference model. Moreover, the specific surgeon performing the specific operation could remain unspecified. It would also be possible that, in the context of the generic reference model, no stipulations are made in advance in relation to the utilized items of medical equipment. Therefore, this means that the planned operation can describe a number of possible specific operations. Accordingly, it is possible for the generic reference model to envisage variability in conjunction with for example the anatomy of the patient and/or different surgeon-specific courses of the operation and/or different utilized items of medical equipment. This would mean that the generic reference model provides for certain modifications—for example typical modifications or else admissible modifications—which may occur in the context of the individualization of the planned operation, i.e., in the specific operation. By way of example, this could be implemented by the provision of appropriate value ranges for various parameters. This could be implemented by the provision of various alternative instances for a landmark of the generic reference model.

As a general rule, there are various options for implementing the reference model. By way of example, the reference model could be implemented as a decision tree. The decision tree could have a multiplicity of landmarks as nodes. However, it would also be conceivable to implement the reference model as a machine-learned model, for instance as an artificial neural network. The artificial neural network could then receive state data as an input and provide adapted landmarks as an output. The landmarks can be adapted to the specific state data. [Patent Claim 8]. The reference model could be implemented as a statistical atlas which thus links certain landmarks to occurrence probabilities and describes relationships between the landmarks.

The generic reference model can use landmarks to describe the planned operation. Here, in general, a landmark describes a certain status which the operation can adopt. Examples of different landmarks are described in the context of Table 2.

TABLE 2

Examples of different types of landmarks of a generic reference model for a planned operation. The different types of landmarks can be combined with one another in order to define the generic reference model. The various landmarks can each be associated with a variability. This means that deviations from a specific value of the corresponding described variable can be described as admissible or inadmissible.

| | Brief description | Exemplary details |
|---|---|---|
| I | Anatomical landmark | An anatomical landmark can describe a type and an arrangement of certain anatomical features of the patient. By way of example, the anatomical landmark could describe the relative position of blood vessels. An anatomical landmark could describe a number of blood vessels and the relative orientation thereof with respect to one another. The anatomical landmark could describe the relative position of a tumour or foreign body in the patient. The anatomical landmark could describe instances of vessel branching. |
| II | Course landmark | A course landmark can describe the course of events of the operation. In this way, it would be possible to describe a succession of actions by the surgeon or operative interventions, for example. A special form of course landmarks describes a branching between different courses of an operation. By way of example, different courses of an operation could be associated with different types of activity. The corresponding instances of branching can then specify the complexion of the specific course of the operation. By way of example, a course landmark could describe when a certain mode of operation of the surgical microscope, for example the fluorescence mode, is activated. By way of example, a course landmark could describe when a certain intervention—e.g., opening the scalp—is performed. By way of example, a course landmark could be combined with one or more anatomical landmarks. In this way, a surgical action, for example, can be defined in relation to one or more anatomical features. |
| III | Time landmark | By way of example, coupled with the course landmark, a time landmark can describe a time dimension for the order of certain actions. By way of example, different times of phases of the operation (operation phase) could be described on the basis of time landmarks. |
| IV | Interaction landmark | A landmark can also describe interaction points with the surgeon or other members of medical staff By way of example, an interaction landmark could describe the output of an instruction or status update for the surgeon. It would also be conceivable to query feedback of a surgeon in relation to the specific operation. |
| V | Device use landmark | It would be conceivable for the use of certain devices and/or certain device properties to be stored in the reference model as a device use landmark. By way of example, it would be conceivable for a corresponding device use landmark to specify the use of characteristic functions of the surgical microscope, for example certain fluorescence modes of operation. The end of a certain operation phase could be indicated by the deactivation or the switchover of a device. |

Various techniques described herein allow using the state data which describe the specific operation (cf. Table 1) to individualize a generic reference model which is described in the context of a planned operation. Such an individualization may consist in one or more landmarks of the generic reference model (see Table 2) being adapted to the specific operation. [Patent Claim 1].

Such an adaptation of the one or more landmarks to the specific operation may mean that, for example, a specific value for the variable described by the corresponding landmark is chosen from within a variability of the corresponding landmark.

As a general rule, the state of the specific operation can be determined on the basis of the state data and this state can be compared to the landmarks of the generic reference model. Then, one or more of the landmarks can be adapted on the basis of such a comparison. By way of example, a status indicated by the landmarks can be selected in agreement with the state of the state data.

On the basis of the detected state of the specific operation, one or more of the following operations could be carried out to adapt the one or more landmarks: (i) The spatial position and/or orientation (positioning) of an anatomical landmark can be adapted on the basis of the specific position and/or orientation of an anatomical feature. An anatomical landmark could be adapted in such a way that the latter is made specific to a specific variant of an anatomical variation. (ii) The temporal position of a time landmark of the reference model can be set to the specific time instance of the corresponding action. (iii) The type of an anatomical variation can be determined. (iv) A certain course of the operation can be chosen from a plurality of courses for the operation.

This means that the one or more landmarks are adapted for example in patient-specific fashion for a patient of the specific operation. By way of example, this would apply to an anatomical landmark (see Table 2: Example I). It would also be possible for one or more landmarks to be adapted in surgeon-specific fashion for the surgeon of the specific operation. By way of example, this would apply to course landmarks and/or time landmarks (see Table 2: Example II or Example III). A further example relates to the device-specific adaptation of one or more landmarks (see Table 2: Example IV).

By way of such an individualization of the generic reference model in relation to the specific operation on the basis of the state data, it is possible to facilitate a particularly accurate and reliable interaction with the surgeon performing the operation. By way of example, if assisting instructions are output to the surgeon performing the operation, these assisting instructions can be meaningful specifically for the specific course of the specific operation. Monitoring the operation—for example in the context of extraordinary events—can be implemented in targeted fashion for the specific operation. However, it may at the same time be possible to dispense with performing the individualization of the generic reference model preoperatively. By way of example, it may be possible to dispense with the capturing of image data of the anatomy of the patient preoperatively and using these for the individualization of the generic reference model. By way of example, it may be possible to dispense with parametrizing the course of the specific operation preoperatively by a user. Firstly, this reduces the complexity for the manual individualization of the generic reference model. Secondly, it is possible to react flexibly and quickly to intraoperative events.

By individualizing the reference model it is possible to facilitate a comparability between different operations and patients. In the process, the anatomical variations in the human body should be taken into account. By way of example, the number of vessels, the number and relative position of the instances of branching (bifurcation, trifurcation, . . . ) and the lengths thereof can vary. Therefore, meaningful individualizations are implemented at recognizable landmarks (e.g., anatomical landmarks), on the basis of which the reference model can then be normalized again (both in terms of the relative spatial position and optionally also during the temporal course of the operation).

Some examples are specified below in the context of adapting anatomical landmarks. By way of example, if an anatomical landmark describes a plurality of admissible configurations of a corresponding anatomical feature, it would be possible to select a specific configuration from the set of admissible configurations. By way of example, one example of different configurations of the "middle cerebral artery (arteria cerebri media)" are "bifurcation—same trunks"; "bifurcation—inferior trunk dominant"; "bifurcation—superior trunk dominant"; "trifurcation"; "quadfurcation"; "duplicated principal artery"; "assisting principal artery". This is only one example and very different types of the configurations may occur depending on the anatomical feature.

By way of example, it would be conceivable for state data to comprise image data of a target region of the specific operation in the patient, which were captured during the operation. Then, individualizing the generic reference model may comprise patient-specific adapting of one or more anatomical features within the variability on the basis of these image data of the patient.

In addition to the above-described individualization by adapting anatomical landmarks, a further option for individualizing the reference model consists of taking account of characteristic actions of the course of the operation and adapting the landmarks in this respect, i.e., an individualization of course landmarks and/or time landmarks (cf. Table 2, Example II and Example III). Thus, the individualization of the generic reference model can comprise the surgeon-specific selection of a course of an operation and/or the surgeon-specific adaptation of the timing of the operation. By way of example, if a course landmark (see Table 2: Example II) describes a branching between different courses of the operation, then it would be possible to select a certain course.

FIG. 1 schematically shows a surgical microscope 801 for surgery. In the illustrated example, the surgical microscope 801 comprises an eyepiece 803. Through the eyepiece 803, the surgeon can observe magnified images of an object which is situated in a field of view 804 of the surgical microscope 801. In the illustrated example, this is a patient 805 lying on a patient couch.

As an alternative or in addition to an optical eyepiece, provision could also be made for a camera which transmits images to a screen (digital surgical microscope).

An operating device 808 is also provided as a human-machine interface; by way of example, it can be embodied as a handle or a foot switch. It is a handle in the illustrated embodiment of FIG. 1. The operating device 808 allows the eyepiece 803, which is fastened to cross beams 850, to be moved. Motors can be provided in order to automatically carry out the movement on the basis of control data. The motors could also assist the movement prompted by the handle 808.

Further, a control device 809 which controls the operation of the combination microscope is provided for the surgical microscope 801. The control device 809 can interact with the surgeon. The control device 809 can provide state data, for example for relative positioning (distance and/or orientation) of the eyepiece 803 with respect to the patient 805 or, in general, in a reference coordinate system, or for the operating mode of the imaging means, etc. The control device 809 could also provide images from optional sensors 860 (e.g., depth sensor, surround sensor such as a surround camera) as state data. By way of control data, the control device could also alter various settings, for example an imaging mode or the relative positioning.

As a general rule, while a surgical microscope 801 is illustrated in the example of FIG. 1 as an example of an item of medical equipment, further or other items of medical equipment can also be used in addition to or as an alternative for the surgical microscope 801 in the various examples described herein. Such items of medical device can provide state data which are indicative for the state of the operation. These state data can then be processed further, for example by a device 90 as illustrated in FIG. 2.

Figure 2:
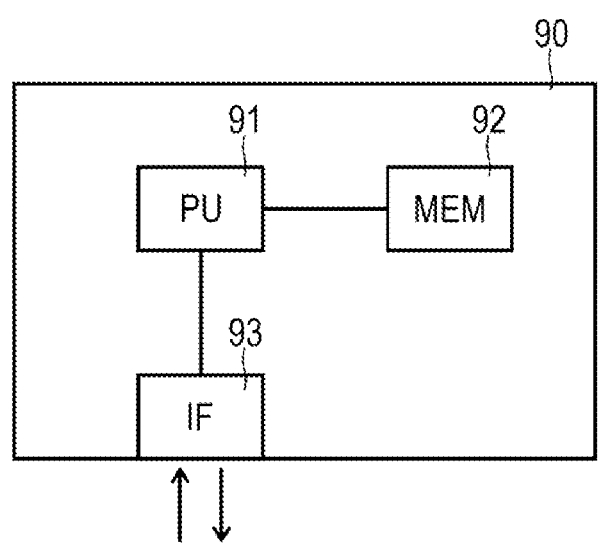
FIG. 2 illustrates a device for data processing as per various examples.

FIG. 2 schematically illustrates a device 90 that can be used for the data processing in the various examples described herein. By way of example, the device 90 could be a PC or a cloud server. The device 90 comprises a processor unit 21 (also referred to as data processing hardware) and a non-volatile memory 92 (also referred to as memory hardware). The processor unit 91 can load program code from the non-volatile memory 92 and execute said code. This causes the processor unit 91 to carry out techniques in accordance with the examples described herein, for example obtaining a generic reference model (for example from a database, via a communications interface 93, or from the memory 92 or via the communications interface 93 from a human-machine interface); receiving state data that describe a specific operation, for instance via the communications interface 93, for example from the surgical microscope 801; individualizing the generic reference model on the basis of the state data; adapting one or more landmarks of the generic reference model on the basis of the state data; etc.

Further details in relation to the exemplary data processing of the device 90 are described below, in the context of the flowchart in FIG. 3.

Figure 3:
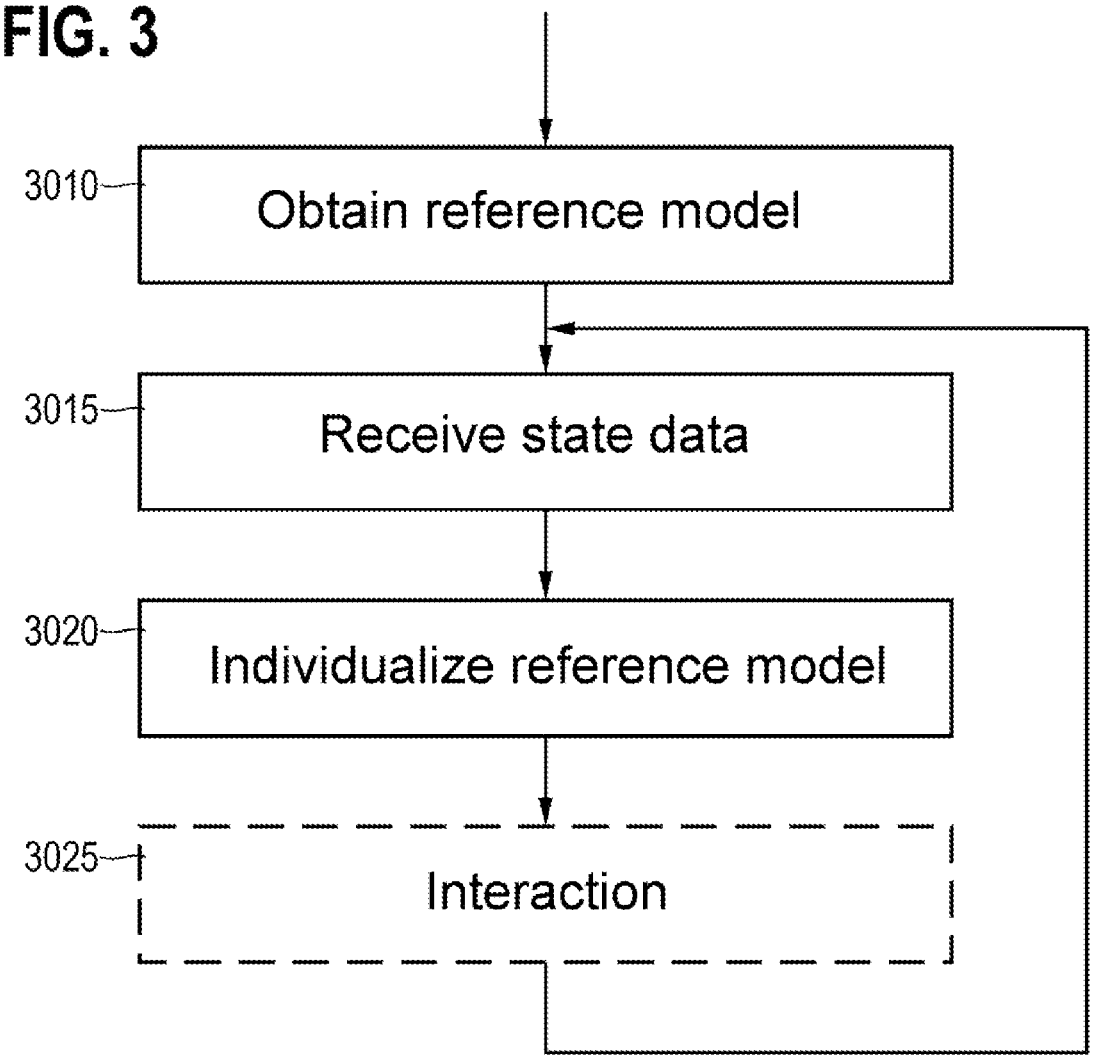
FIG. 3 is a flowchart of one exemplary method.

FIG. 3 is a flowchart of one exemplary method. By way of example, the method of FIG. 3 could be carried out by the device 90. In particular, the method as per FIG. 3 could be carried out by the processor unit 91 on the basis of program code loaded from the memory 92.

A reference model is obtained in Box 3010. By way of example, the reference model can be loaded from a database. The database can store a plurality of candidate reference models. The reference model could be loaded on the basis of appropriate instructions by a user. By way of example, the reference model could be chosen on the basis of an operating theatre booking plan.

The reference model can describe a generic operation. The reference model may comprise a multiplicity of landmarks (see Table 2). By way of example, the reference model can be obtained at the start of a specific operation, the specific operation representing a specific instance of the generic operation.

Different algorithmic implementations for the generic reference model are conceivable. By way of example, a deterministic decision tree could be used. However, machine-learnt models could also be used.

Subsequently, state data are received in Box 3015. In this case, there may be a plurality of sources for the state data. Moreover, different types of state data can be received (see Table 1), for example sensor data and/or control data.

Then, the reference model is individualized on the basis of the state data in Box 3020. To this end, one or more landmarks of a multiplicity of landmarks of the reference model can be adapted on the basis of the state data and to the specific operation described by the state data. This adaptation could be implemented in patient-specific and/or surgeon-specific and/or device-specific fashion.

Specifically, adapting a landmark may mean that a state that is parametrized by the landmark is set to a specific state of the specific operation. This could also be referred to as specifying the landmark. By way of example, a further example of adapting the landmark would be where the landmark already describes a specific state but the latter deviates from the actually observed specific state of the specific operation. Then, the specific state of the landmark could be altered such that it correctly reproduces the specific state of the specific operation. This can also be referred to as altering the landmark.

It would also be conceivable for the various landmarks to depend on one another. By way of example, a time landmark could depend on a course landmark. This means that different courses of the operation might be associated with different time axes. It would also be possible for different anatomical landmarks to depend on one another. By way of example, an anatomical landmark in conjunction with the principal artery could describe the anatomical feature of "bifurcations". Then, there can be two dependent anatomical landmarks, which describe the following: "bifurcation—inferior trunk dominant" and "bifurcation—superior trunk dominant", i.e., further specific embodiments of the general anatomical feature. Course features may depend sequentially on one another in order to describe the progress of the operation. In such scenarios it is conceivable that adapting a first landmark depends on how a second landmark, which is arranged so as to be hierarchically superordinate to the first landmark, is adapted. What this can achieve is that an iteratively increasing degree of individualization can be achieved with great accuracy. It is possible to take account of complex relationships which describe the progressing course of the operation.

Then, interaction with the user can be carried out in the optional Box 3025. By way of example, this may contain outputting user guidance to the surgeon. It would also be possible to monitor the actions of the surgeon on the basis of the individualized reference model, for example carry out an anomaly detection which can specify deviations from an envisaged course of the specific operation. The envisaged course of the operation can be defined by the individualized reference model. A quality assessment would also be conceivable.

It is evident from these examples that an interaction with the surgeon is facilitated on the basis of individualization of the reference model. Below, this individualization of the reference model is described in more detail in the context of the example in FIG. 4.

Figure 4:
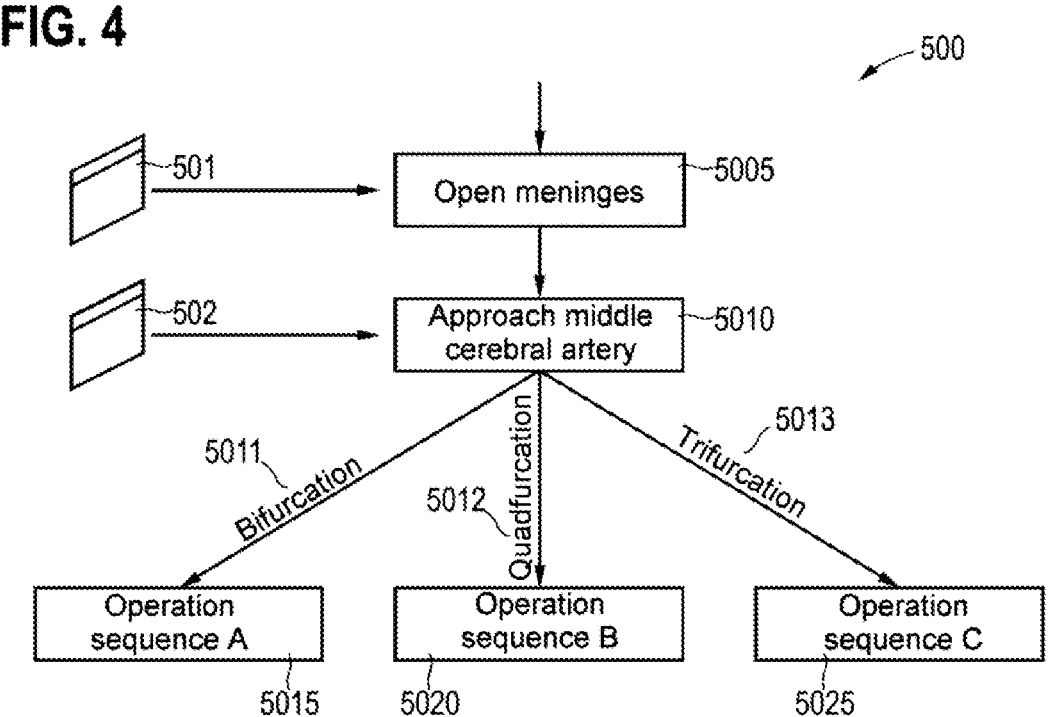
FIG. 4 schematically illustrates a generic reference model as per various examples.

FIG. 4 illustrates an exemplary reference model 500. The reference model 500 is embodied as a decision tree in the example of FIG. 4. The reference model 500 comprises a plurality of landmarks 5005, 5010, 5011-5013, 5015, 5020, 5025.

The landmarks 5005, 5010, 5015, 5020 and 5025 in this case describe the course of the operation, i.e., the course landmarks; see Table 2: Example II. By way of example, the course landmark 505 ("open meninges") could be associated with a time landmark that initializes a timer which measures a maximum opening time of the meninges until these are closed by the surgeon (not illustrated in FIG. 4).

On the basis of the reference model, it is possible to monitor whether the specific operation also in fact reaches the corresponding state that is described by the course landmark 5005. Reaching the course point "opening the meninges" in the context of the course landmark 5005 can be recognized, for example, by an object recognition on the basis of image data of the surgical microscope 801; these image data are an example of state data 501 that describe the specific operation. By way of example, an appropriate artificial neural network may have been trained to recognize the meninges being opened in the image data. As an alternative or in addition thereto, an audio stream, for example, could be monitored and a cue—for instance "meninges opened"—could be recognized in the audio stream. Corresponding state data 501 are illustrated in FIG. 4.

Figure 5:
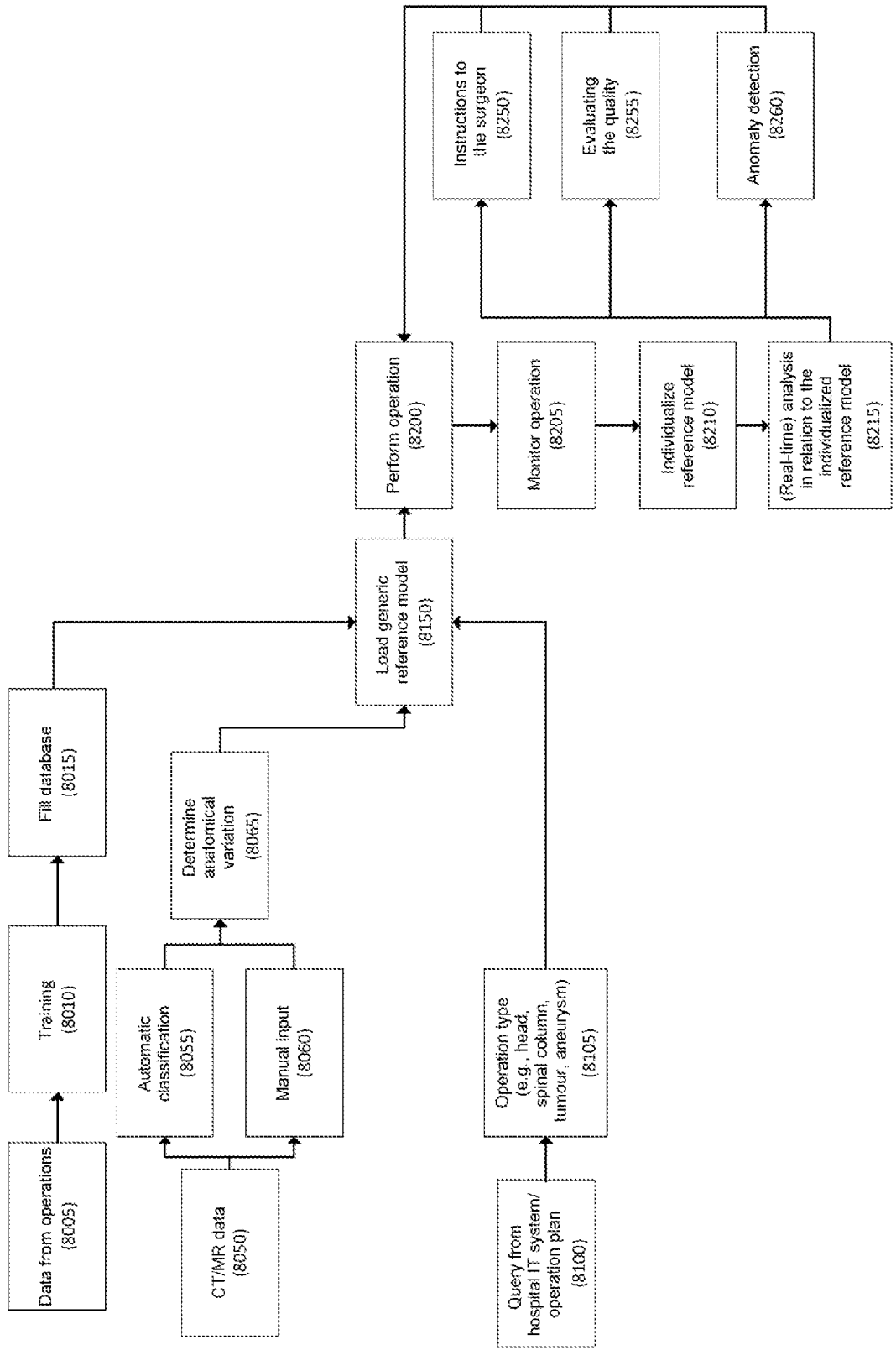
FIG. 5 schematically illustrates an exemplary workflow before and while a specific operation is performed as per various examples.

The course landmark 5010 ("approach middle cerebral artery") defines a branching between different courses of the operation, which are described by the course landmarks 5015, 5020 and 5025. Here, the selection is made between the various courses of the operation on the basis of anatomical landmarks 5011, 5012, 5013. In particular, the anatomical landmark of "principal artery" is specified by virtue of selecting the specific embodiment of "bifurcation", "trifurcation" or "quadfurcation". By way of example, this can be based on image data from the surgical microscope 801. FIG. 5 illustrates corresponding state data 502.

This is one application example. A further specific example is described below, to be precise the use of an automatically recognized anatomical landmark for the spatial individualization of a reference model. In order to place an aneurysm clip at the posterior communicating artery the optic nerve is identified first. This can be implemented in exemplary fashion on the basis of object recognition in image data of the surgical microscope 801, for example object recognition by means of machine learning. Moreover, the relative distance from the identified optic nerve is determined by the surgical microscope, i.e., for example, using an integrated depth sensor such as TOF or lidar, stereoscopy, navigation, etc. This relative spatial position is now used for individualization of the reference model. The exemplary operation phases can be described by the following course landmarks: (I) identifying the optic nerve; (II) placing the frontal retractor; (III) dividing the lateral fissure; (IV) opening the optic-carotid triangle; (V) proximal control; (VI) exposing the proximal internal carotid artery; (VII) identifying the point between the origin of the posterior communicating artery and the proximal attachment site; (VIII) tracking the distal course of the posterior communicating artery; (IX) identifying the point between the anterior choroidal artery and the distal attachment site; (X) releasing the deposits in the tentorium. By means of image processing on the video stream of the surgical microscope, phase (IV) is now recognized automatically (e.g., by way of a machine learning approach), since the "optic-carotid triangle" can be uniquely identified in the image. The recognition of this anatomical feature can now be used to set the corresponding temporal landmark for the operation phase (IV) for individualizing a reference model in relation to the specific time of the observation.

FIG. 5 illustrates a workflow in conjunction with planning and performing a specific operation.

Data from earlier operations are collected in Box 8005. A generic reference model is parametrized in Box 8010 on the basis of the data of the earlier operations. By way of example, this could comprise training an artificial neural network or configuring a decision tree. Then, a corresponding database containing a plurality of generic reference models for different types of operations is filled in Box 8015. Thus, Boxes 8005-8010-8015 describe techniques for the creation of a generic reference model. In principle, corresponding techniques are known and so no further details need to be described here. By way of example, an example as described in Jin, Yueming, et al. "Multi-task recurrent convolutional network with correlation loss for surgical video analysis." *Medical image analysis* 59 (2020): 101572, which is incorporated herein by reference.

Then, a suitable generic reference model can be loaded from the database in Box 8150 before a specific operation is performed at Box 8200. By way of example, the suitable generic reference model can be found by virtue of obtaining an appropriate request from the IT system of the hospital on the basis of the operating plan, Box 8100. The latter can be queried or provided in a push communication. From this, it is possible to determine the type of the upcoming specific operation, Box 8105.

Sometimes, a plurality of generic reference models may also be available for an operation type. Then it would be conceivable for an anatomical classification to be performed automatically in Box 8055 and/or an appropriate manual input to be obtained from a user at Box 8060, for example on the basis of preoperative image data captured in Box 8050. Then, the specifically present anatomical variation of the particular patient can be determined at Box 8065 and the suitable generic reference model can be chosen from a set of candidate reference models at Box 8150 on the basis of this information.

A specific operation is performed in Box 8200. At the same time, state data describing the current operation state are captured during the operation. This corresponds to the monitoring of the operation in Box 8205. By way of example, the state data can describe a progress of the operation. The state data can describe what devices are used during the operation. The state data can describe certain actions. Examples of the state data were described above in the context of Table 1.

Then, the generic reference model, which was loaded in Box 8150, is individualized in Box 8210.

The individualization of the reference model in Box 8210 was already described in detail above. Briefly, a position of an anatomical landmark can be registered there to the specific position of the corresponding anatomical feature. Anatomical variations could be determined. A certain course of the operation could be recognized. A normalization to specific timing could be implemented. By way of example, this could be implemented on characteristic interaction patterns with items of medical equipment.

As a general rule, the individualization of the reference model can comprise the adaptation of landmarks of the reference model to the specific operation on the basis of the monitoring in Box 8205. Adapting the landmarks can contain (i) a specification of a landmark, i.e., setting to a certain value/state, for instance within a given variability; or (ii) the alteration of a certain value/state.

Then, an analysis of the behaviour during the operation can be carried out on the basis of the individualized reference model. By way of example, deviations from the individualized reference model could be determined. The next upcoming actions in the operation could also be determined.

Then, one or more different applications could be carried out on the basis of the analysis of the specific operation in Box 8215. FIG. 5 illustrates three exemplary applications, namely the output of instructions to the surgeon in Box 8250, the evaluation of the quality of the operation in Box 8255 and/or an anomaly detection in Box 8260.

It is possible that one or more of these applications trigger feedback for performing the operation in Box 8200, i.e., a continuous human-machine interaction. By way of example, the surgeon could perform further actions of the operation on the basis of the instructions from Box 8250. If an anomaly detection is triggered, Box 8260, this could also imply an appropriate action by the surgeon.

In conclusion, techniques were described above which, in particular, allow the sensors (including image sensors) of a surgical microscope to be used for the continuous recognition of landmarks during a microsurgical intervention in order to individualize reference models on the basis of this information for the analysis of the behaviour during the operation.

Thus, an intraoperative analysis of the use behaviour of a surgical microscope during an operation, e.g., a microsurgical intervention, is facilitated by way of a comparison with a reference model defined in advance. Use behaviour in this case contains both the alignment of the device at an anatomy (e.g., focal point of the surgical microscope on the site) and the use of the device (number of interactions, movements, focusing actions, etc.) itself.

It goes without saying that the features of the embodiments and aspects of the disclosure described above can be combined with one another. In particular, the features can be used not only in the combinations described but also in other combinations or on their own without departing from the scope of the disclosure.

By way of example, techniques are described above for which there is no need for an individualization of the reference model in advance, for example on the basis of preoperative image data or other information collected preoperatively. This means that starting in "blind flight" is possible, based on the generic reference model, in the various variants. Then, the reference model can be individualized during the operation. However, in other examples it would also be conceivable for at least a part of the generic reference model to be individualized on the basis of information collected preoperatively. By way of example, such information could be obtained by manual input. It is then conceivable that such an individualization implemented in advance is complemented and/or replaced by a preoperative adaptation of corresponding landmarks in the then (partly) individualized reference model.

Moreover, techniques in which a reference model is individualized are described above, i.e., landmarks are adapted for example within a given variability. What may occur here is that it is determined—on the basis of intraoperative state data—that a certain variability provided for in the reference model is insufficient for carrying out an individualization of the reference model in such a way that the actual state of the specific operation is mapped correctly. Instead of individualizing the reference model, it could be possible in such a case for a completely different reference model to be loaded from a set of candidate reference models and subsequently individualized on the basis of the state data. This means that a different reference model can optionally be chosen on the basis of a comparison between the state data and an envisaged variability of the reference model.

The invention claimed is:

1. A computer-implemented method executed by data processing hardware that causes the data processing hardware to perform operations comprising:
obtaining a generic reference model for a planned operation to be performed on a patient, the generic reference model defining a multiplicity of landmarks of the planned operation and including unspecified patient anatomy, the multiplicity of landmarks comprising one or more course landmarks defining a respective at least one of a mode of operation of a surgical microscope, a type of activity of a surgeon, or an operation phase of the operation, wherein the multiplicity of landmarks comprises course landmarks that may be applicable to at least some of a plurality of potential patients, and wherein at least one of the course landmarks is not applicable to the patient; and while performing a specific operation on the basis of the planned operation on the patient, the specific operation performed by a surgeon monitored, in real time, by the data processing hardware:
  using one or more device sensors of the surgical microscope to receive state data describing a current state of the specific operation being performed on the patient;
  individualizing the generic reference model in relation to the specific operation on the basis of the state data to the patient, wherein individualizing of the generic reference model comprises adapting one or more course landmarks of the planned operation to the specific operation, and wherein individualizing the generic reference model comprises a surgeon-specific selection of a course of the operation from the one or more course landmarks; and
  on the basis of individualizing the generic reference model, triggering an interaction with the surgeon performing the specific operation being performed on the patient, wherein the interaction comprises at least one of:
    user guidance for the surgeon;
    anomaly detection for deviations from an envisaged course of the specific operation; and/or
    quality assessment.

2. The method of claim 1, wherein the one or more course landmarks are adapted in patient-specific fashion for a patient undergoing the specific operation and/or in surgeon-specific fashion for the surgeon performing the specific operation and/or in device-specific fashion for a set of medical devices for the specific operation.

3. The method of claim 1,
wherein a plurality of landmarks of the multiplicity of landmarks depends on one another, at least in part, in hierarchic fashion, and
wherein adapting a first landmark of the plurality of landmarks depends on how a second landmark of the plurality of landmarks, which is arranged so as to be hierarchically superordinate to the first landmark, is adapted.

4. The method of claim 1,
wherein the multiplicity of landmarks of each respective alternative course of the one or more courses of the planned operation comprise one or more anatomical features and a respectively associated variability,
wherein the state data comprises image data of a target region of the specific operation in a patient undergoing the specific operation, which were captured during the specific operation, and
wherein adapting the one or more landmarks of the planned operation to the specific operation comprises patient-specific adapting of the one or more anatomical features within the respective associated variability on the basis of the image data of the patient.

5. The method of claim 1,
wherein the multiplicity of landmarks of the generic reference model comprise one or more instances of branching between the one or more courses of the planned operation, and
wherein adapting the one or more landmarks of the planned operation to the specific operation comprises a surgeon-specific selection of at least one alternative course of the specific operation from the one or more courses of the planned operation.

6. The method of claim 1,
wherein the multiplicity of landmarks of the generic reference model are associated with a corresponding timing of operation actions for the one or more courses of the planned operation, and
wherein adapting the one or more landmarks of the planned operation to the specific operation comprises a surgeon-specific adaptation of the timing.

7. The method of claim 1, wherein the state data comprises at least one of:
  image and/or sensor data of a surgical microscope for the specific operation;
  surround monitoring data of a surgical microscope for the specific operation;
  image data of an operating theatre for the specific operation;
  audio data from an operating theatre for the specific operation;
  user input received by a human-machine interface for a surgeon;
  settings of one or more items of medical equipment for the specific operation; and/or
  relative positioning between items of medical equipment and a site of a patient.

8. The method of claim 1, wherein the generic reference model comprises at least one of a decision tree, which has the multiplicity of landmarks as nodes, or an artificial neural network, which receives the state data as input and provides adapted landmarks of the multiplicity of landmarks as output.

* * * * *